Oct. 3, 1933.     J. EDGAR     1,928,646
ROTARY CUTTER
Filed Oct. 12, 1928
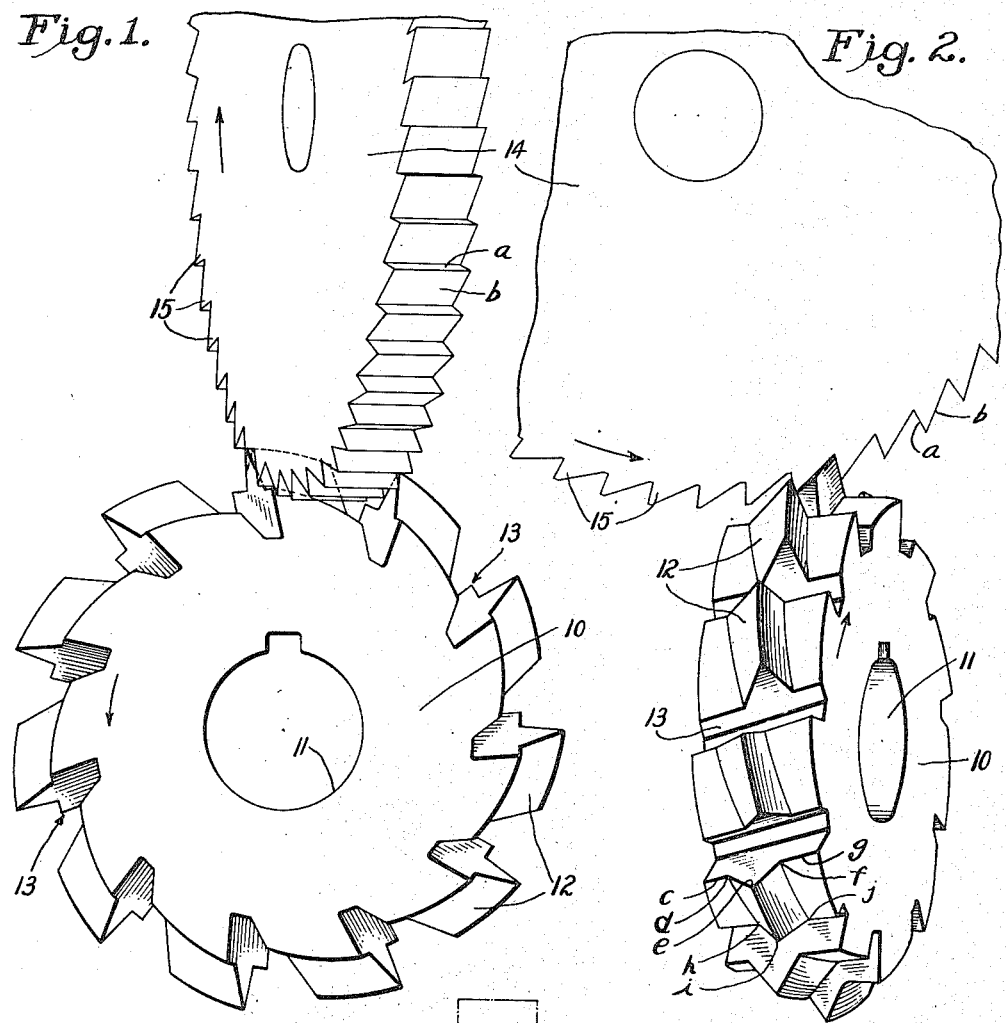
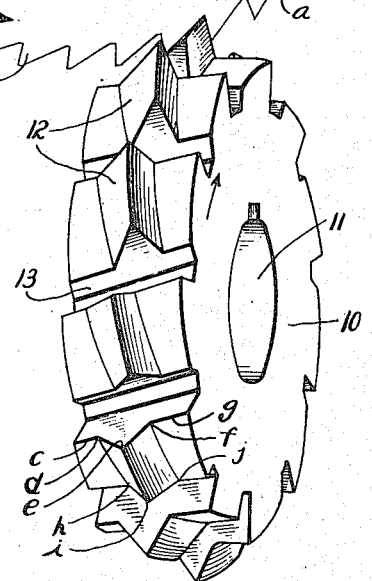
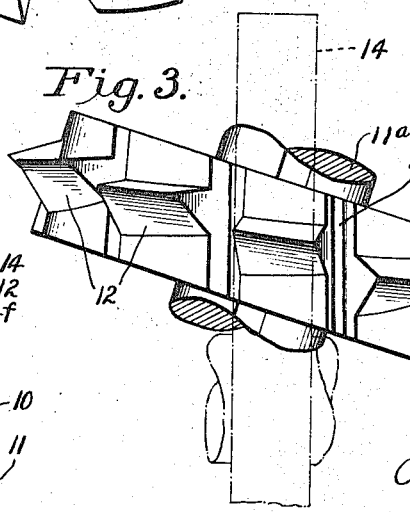
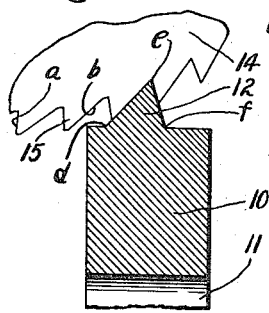
INVENTOR
John Edgar
BY
ATTORNEYS Patented Oct. 3, 1933

1,928,646

UNITED STATES PATENT OFFICE 1,928,646

ROTARY CUTTER

John Edgar, Rockford, Ill., assignor to Barber-Colman Company, Rockford, Ill., a corporation of Illinois Application October 12, 1928. Serial No. 312,073

5 Claims. (Cl. 29—103)

The present invention relates to improvements in rotary cutters, such as hobs.

The primary object of the present invention resides in the provision of a multiple thread hob having a single tooth per thread.

Another object resides in the provision of a new and improved hob which serves to cut the teeth of a work blank in a forming process and not in a generating process.

Further objects and advantages will become apparent as the description proceeds.

In the accompanying drawing, Fig. 1 is a fragmentary view in side elevation of a hob embodying the features of my invention in operative relation to a work blank.

Fig. 2 is a perspective view thereof.

Fig. 3 is a plan view thereof.

Fig. 4 is a fragmentary sectional view taken through one of the hob teeth while in engagement with the work blank.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawing, the hob constituting the preferred form of the invention comprises a rotary body 10 having an axial bore 11 adapted to receive the usual arbor 11a. The periphery of the body 10 is formed with a plurality of uniformly spaced teeth 12 separated by spiral gashes 13.

The teeth 12 are formed with a contour adapted to cut a predetermined contour. This contour is made to suit the work. In the present instance, a ratchet 14 having serrated teeth 15 is shown as the work blank. Each of the teeth 15 has a face a and a back b. The contour of each of the teeth 12 comprises a cutting edge c—d—e—f—g, of which the sections d—e and e—f are inclined and meet at the point e. The sections d—e are adapted to cut the backs b, and the sections e—f are adapted to cut the faces a, of the teeth 15 of the work blank.

The backs of the teeth 12 are suitably relieved. Preferably, the relief is generated in Archimedian spirals so that the faces of the teeth 12 can be ground without altering the effective cutting contour. In the drawing, the relief is shown generated along lines d—h, e—i, and f—j. The relief is rectilinear with reference to the cutting edges, and hence is oblique to the axis of the hob so as to provide clearance.

In use, the hob is positioned across the work blank 14 at an angle as best shown in Fig. 3. This angle corresponds substantially to the angle of the gashes 13. The hob and the blank are rotated continuously, and the rotation of the blank is correlated to that of the hob so that the teeth 12 will cut straight teeth 15, and successive teeth 12 will cut successive teeth 15.

The teeth 12 are out of helical alinement about the body 10, and preferably are arranged in a single transverse plane. Hence, each tooth 12 constitutes a separate thread, and the hob has as many threads as there are teeth. Thus, the rotation of the blank 14 serves to compensate for the advance of each tooth 12 during each cut resulting from the relative angular disposition of the hob, and to index successive teeth 15 into position for engagement by successive teeth 12. The inclined relief of the teeth 12 provides the necessary clearance. The teeth 15 are formed and not generated as is best shown in Fig. 4.

Thus, the cutter is a form cutter, and not a generating cutter. Rotation of both the work blank and the cutter during cutting engagement does not of itself determine the character of the resulting action, i. e. whether the action is based on the molding-generating principle or on the forming principle. The generating principle is characterized in that the cutter edge having one shape is rolled relatively to the work blank to produce in the latter a surface having a different shape. In a forming action, the cutting tooth imparts a complemental shape to the work blank. Hence, each tooth of the present cutter has a shape which is the inverse duplicate of the space to be cut, i. e. the cutting contour of the tooth is complemental to the surface to be formed.

I claim as my invention:

1. A form milling cutter comprising a cylindrical body having a plurality of equally spaced similar teeth on its periphery, said teeth being separated by gashes inclined to the axis of rotation and extending from end to end of the body and being arranged in identically similar positions relative to a plane perpendicular to said axis, each of said teeth constituting a separate thread and having a cutting contour other than a straight line along the contiguous front gash and having a spiral relief rectilinear relative to the cutting edge.

2. A form milling cutter comprising a rotary body having a plurality of teeth on its periphery, said teeth being separated by gashes extending transversely thereof and inclined to the axis of rotation and being arranged in identically similar positions relative to a plane perpendicular to said axis, each of said teeth constituting a separate thread and having a cutting contour other than a straight line along the contiguous front gash and having a relief oblique to said axis.

3. A form milling cutter comprising a rotary body having a plurality of closely spaced teeth on its periphery, said teeth being separated by gashes extending transversely thereof and inclined to the axis of rotation and being arranged in identically similar positions relative to a plane perpendicular to said axis, each of said teeth constituting a separate thread and having a cutting contour along the contiguous front gash comprising oppositely inclined joining cutting elements, and having a relief inclined to said axis in a direction opposite to that of said gashes.

4. A form milling cutter comprising a rotary body having a plurality of similar teeth on its periphery, said teeth being separated by an equal number of equally spaced gashes extending transversely thereof, each of said teeth constituting a separate thread and having a cutting face defined by the contiguous gash at the leading end and being relieved from the cutting contour defined by said face toward the contiguous gash at the trailing end, said contour being the inverse duplicate of the surface to be cut.

5. A form milling cutter of the hob type comprising a rotary body having a plurality of teeth on its periphery, said teeth being separated by an equal number of gashes extending substantially transversely thereof, each of said teeth constituting a separate thread and having a cutting face defined by the contiguous gash at the leading end and being relieved from the cutting contour defined by said face toward the contiguous gash at the trailing end, said teeth being duplicates of each other and being inverse duplicates of the spaces to be hobbed, said teeth being arranged in identically similar positions relative to a plane perpendicular to the axis of rotation.

JOHN EDGAR.